United States Patent [19]
Radebold

[11] 3,986,925
[45] Oct. 19, 1976

[54] POWER PLANT WITH NUCLEAR REACTOR AND MHD-SYSTEM

[76] Inventor: Reinhart Radebold, Quastenhornweg 14a, 1 Berlin 22, Germany

[22] Filed: May 7, 1973

[21] Appl. No.: 357,955

Related U.S. Application Data

[63] Continuation of Ser. No. 71,324, Sept. 11, 1970, abandoned.

[52] U.S. Cl.................................. 176/39; 310/11; 176/65
[51] Int. Cl.².......................................... G21C 9/00
[58] Field of Search .................... 310/11; 176/39, 65

[56] References Cited
UNITED STATES PATENTS

| | | | |
|---|---|---|---|
| 3,140,410 | 7/1964 | McLafferty | 176/39 X |
| 3,140,411 | 7/1964 | Oickle, Jr. et al. | 176/39 X |
| 3,149,248 | 9/1964 | Valfells | 176/39 X |
| 3,201,619 | 7/1965 | Gleason et al. | 310/4 |
| 3,440,455 | 4/1969 | Stahl et al. | 310/4 |
| 3,444,401 | 5/1969 | Gilli | 176/39 X |

*Primary Examiner*—Stephen C. Bentley
*Assistant Examiner*—Peter A. Nelson
*Attorney, Agent, or Firm*—Ralf H. Siegemund

[57] ABSTRACT

Power plant with a plurality of similarly constructed, elongated units, each unit including a closed working fluid loop for MHD-conversion. The electrical outputs are connected in parallel on a common bus. Prime heater is a nuclear reactor distributed among the units, and separately controlled for each of them by a computer, to operate a unit in the cooling mode or in the power mode, depending upon overall power demand. Each unit includes a compressor-turbine aggregate for circulating air for heat exchange with the working fluid.

14 Claims, 4 Drawing Figures

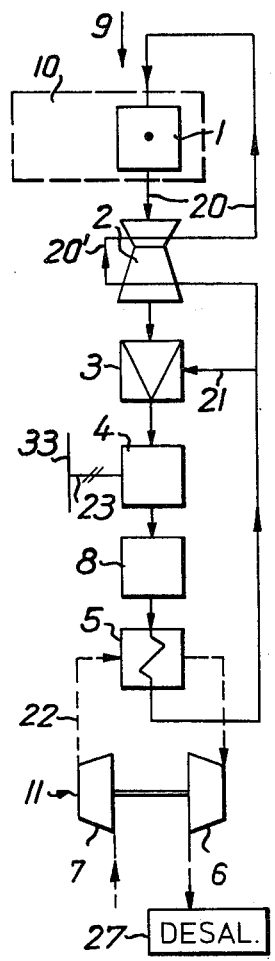
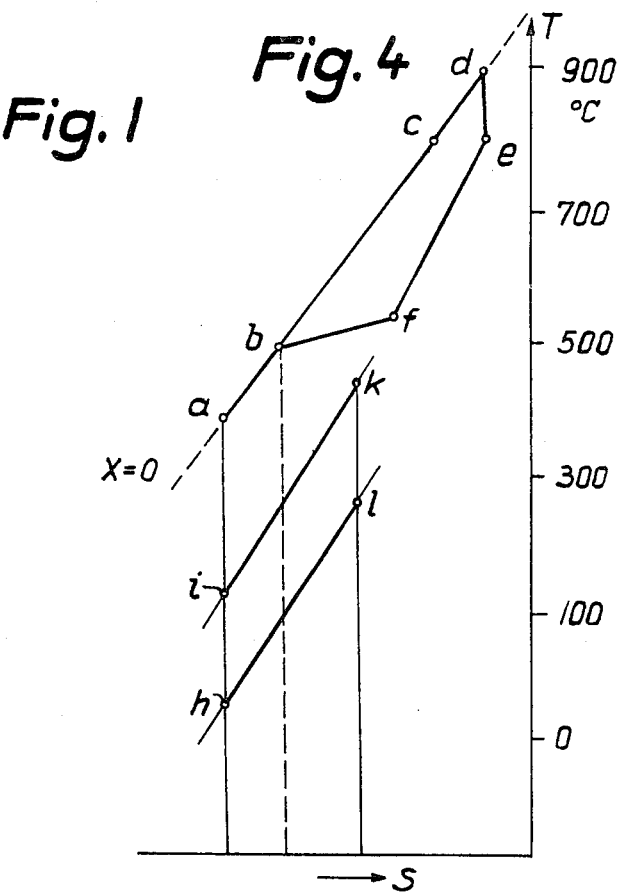
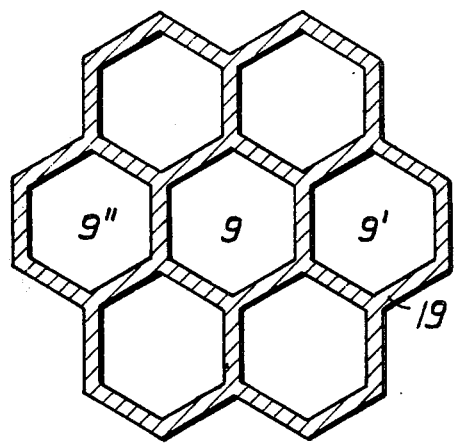

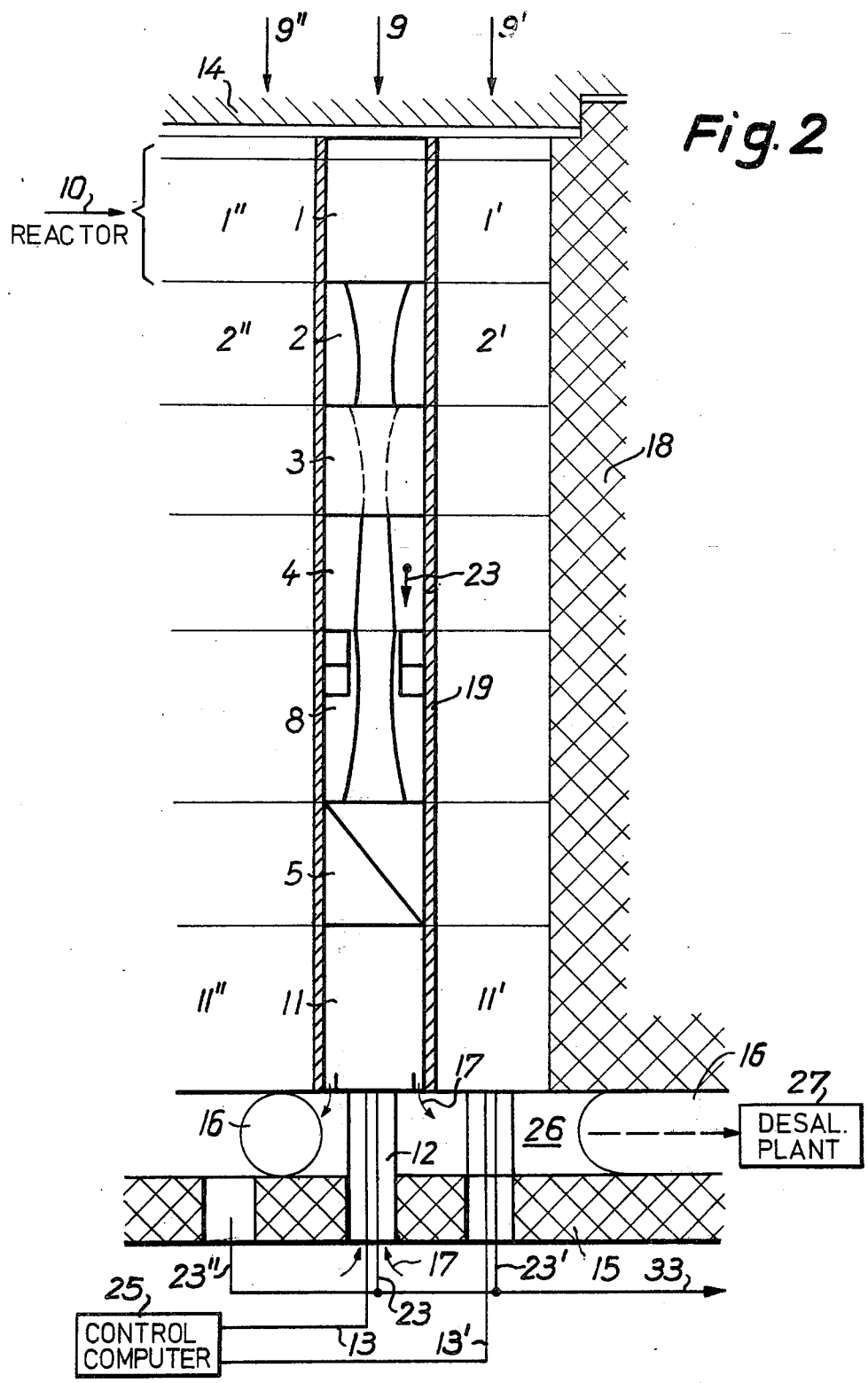

POWER PLANT WITH NUCLEAR REACTOR AND MHD-SYSTEM

This is a continuation of application Ser. No. 71,324, filed Sept. 11, 1970, now abandoned.

The present invention relates to the generation of electrical power by means of nuclear reactor and MHD-system using alkaline metal as working fluid.

In the past, energy gained by nuclear reaction has been extracted from the reactor by heat exchange with a cooling fluid. The thermal energy extracted drives a steam power plant, which, in turn, drives an electric generator. These steam power plants are comprised of large multiple housing type steam turbines which drive the generator. Additional components included in such a conventional power plant are condensers and preheaters. Aside from multiple (lossy) energy conversion reducing the efficiency, these types of power plants are inherently large, and their particular operating characteristics render them unsuitable for the production of energy in space vehicles, such as space stations or the like.

Another system for providing more efficient conversion of nuclear energy into electricity has been developed, particularly for space vehicles. These systems are known under the designation Magneto-Hydro-Dynamic System, or MHD for short. In such a system fluid is heated in a nuclear reactor, accelerated under pressure reduction and caused to flow across a magnetic field. An electric current can be drawn from the fluid along an axis perpendicular to both, the magnetic field and the stream of flowing fluid. Alkaline metals are used as working fluid, to provide for both, extraction of thermal energy from the nuclear reactor and pressure-to-kinetic-to-electric energy conversion in the MHD-system.

The working fluid is employed in the liquid phase and in the gaseous phase. Particularly, when passing through the MHD-system, the fluid is in a fog-like state with liquid droplets carried by a vapor stream. The fluid receives thermal energy from the nuclear reactor operating as prime heat source and providing primarily vaporization. Fluid that enters the reactor is essentially liquidous. Gas bubbles may be created, in some cases, enlarge and merge upon heating. The enthalpy of the gaseous fluid component is subsequently converted into kinetic energy and that, in turn, serves to accelerate the liquid component that is carried along. Electrical energy is taken directly and primarily from the liquid phase as passing through a magnetic field within the MHD-generator.

The MHD-system in accordance with the present invention is an improvement of nuclear MHD-system as they are known. The problem solved by the invention is to provide an economical energy production and conversion that is independent from location and, therefor, suitable for employment in any terrestrial environment. Power rating and power factor are to be subject to selection and control so as to establish a high degree of versatility and reliability of the plant.

In accordance with the present invention it is suggested to organize a power plant as a whole in such a manner that plural, similarly constructed units are provided which operate electrically in parallel on a common electrical power bus. However, each unit includes its own independent MHD unit with an individual, closed loop for the working fluid as circulating through the MHD-generator and the nuclear reactor for heat exchange therein. Each unit shares in the nuclear reactor, and the portion of the reactor included in each unit is individually controllable as to the amount of its contribution in the production of thermal energy. However, the neutron flux penetrates the reactor as a whole.

Air circulation is provided for particular heat-exchange coupling to each working fluid circulation loop, for removing therefrom residual thermal energy prior to recycling through the reactor. For example, a seawater desalination plant may be provided for using the thermal energy in the heated cooling air as discharged from all units. In this case, air flows in an open loop. However, a closed loop circulatory air system could be provided. Cooling air may circulate through each unit by operation of a compressor driven by a gas turbine that extracts thermal energy from the air. Each unit has its own compressor-turbine aggregate.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically a single working fluid loop MHD-process;

FIG. 2 illustrates somewhat schematically a horizontal section view through a plant in accordance with the preferred embodiment of the invention;

FIG. 3 shows somewhat schematically a cross-sectional view through support structure for the plant of FIG. 2; and FIG. 4 is a graph for illustrating the MHD working process as well as air circulation process in a temperature versus entropy diagram.

Proceeding now to the detailed description of the drawings, there is illustrated a nuclear reactor 10, having a plurality of self-contained sections or portions such as 1, 1', 1'' and others. Each reactor portion has its own nuclear fuel elements and control elements, subject to individual control as to each portion. However, neutron flux of the individual sections are intercoupled due to proximity of disposition of the fuel element. Each reactor section pertains to a particular unit, 9 or 9' or 9'' etc., serving individually as principal heat source for such a unit. Each unit, such as 9, includes its own closed circulation loop 20 for a heat exchange medium serving also as working fluid for MHD type electricity generation.

Alkaline metal, such as sodium and/or potassium, circulates through loop 20. Nuclear reactor portion 1 is the principle heating source for the working fluid. Fluid leaving reactor portion 1 passes first through a two phase acceleration nozzle 2 with atomizer; next in the loop is a hollow jet condenser 3, feeding an inductively operating MHD-converter 4. Electric circuit lines 23 indicate schematically the withdrawal of electrical energy from the unit 9. Lines 23 are connected to a power output bus 33. Working fluid leaving MHD-converter 4 passes through a diffusor and shock condenser unit 8, to a heat exchanger 5, serving as cooling device for the principle working fluid in loop 20. A sub-loop 21 branches cooled working fluid off the main loop and couples same into the flow in the hollow jet condenser as part of the operation thereof. The principle return path passes through nozzle 2 for preheating of the working fluid. For the basic unit see, for example, "Electricity from MHD, 1968", Vol. III, page 1440 et seq., IAEA, Vienna 1968.

The dashed line 22 in FIG. 1 denotes an open loop circulation path for air which passes through the heat exchanger 5 for receiving thermal energy from the working fluid, particularly for extracting residual thermal energy from the working fluid prior to entering the return branch of its circulation loop 20. Air is forced through loop 22 by means of a compressor 7 and passes through heat exchanger 5 to a gas turbine 6. The gas turbine extracts enthalpy from the air circulation and drives compressor 7.

Gas turbine 6 and compressor 7 are combined as a driving aggregate of a type which is known from aerodynamics. As conceivably the air circulates in open loop, it is discharged from the turbine, for example, into a desalination plant 27, serving as prime heating medium for the desalination process. For this, the air flows for the several units 9, 9', 9'' etc. are combined.

The MHD working process that takes place in the system as shown in FIG. 1 is accompanied by temperature-entropy changes illustrated in the upper graph of FIG. 4. In FIG. 4 temperature T is plotted along the ordinate, entropy 5 is plotted along the abscissa on a suitable scale; the upper graph has particular validity for the working fluid in loop 20. Changes in state as between liquid and gaseous phases take place in the immediate vicinity of the characteristics of pure liquid (for the alkaline working fluid), and denoted as $X = O$ (X being the quality). Particularly, such changes of state occur partially in the liquid phase proper, partially in the wet steam area.

Beginning with point $d$, that point defines the temperature-entropy state of the liquid metal as working fluid, upon leaving the nuclear reactor. The hot metal is depressurized in accelerator nozzle 2 along line $d \rightarrow e$ as continued along line $e \rightarrow f$, whereby pursuant to the latter portion cooling is provided by means of already cooled, liquidious metal in the return branch 20' and having a relatively low energy content. The two phase stream is additionally cooled in hollow jet condenser 3, along line $f \rightarrow b$, cooling resulting in a nearly complete condensation in the two phase flow. Cooling is provided particularly by operation of branch loop 21, returning some of the already cooled working fluid to the main stream.

Pressure in the working fluid decreases throughout this process, while its kinetic energy is accordingly increased. Point $b$ denotes entry into the MHD-generator 4 wherein energy is extracted from the fluid. The MHD-generator has windings for derivation of particular voltage and current. At this point, electrical energy is taken from the kinetic energy of the working fluid so that its temperature-entropy is not or only insignificantly changed.

Subsequently, the working fluid is cooled in heat exchanger 5 the heat transfer being represented by branch $b \rightarrow a$ as to the working fluid in loop 20. Prior to heat exchange, as between air and working fluid, diffuser 8 regains pressure energy in the latter and thus completes, if necessary, condensation by a shock. Cooling of the working fluid in heat exchanger 5 and along line $b \rightarrow a$ is provided to render sufficiently cool fluid available for use in condenser 3, (sup-loop 2). The line $b \rightarrow c$ is almost identical with limit characteristics $X = 0$ and represents re-generative pre-heating of working fluid in nozzle 2 along a substantially isobaric characteristic. In other words, the branch $b \rightarrow c$ as to the returning working fluid is the heat exchange counter part for fluid entering nozzle 2 undergoing the change $e \rightarrow f$. The working fluid re-enters the reactor at point $c$ in the diagram, wherein it is heated and its state is changed to point $d$, completing the circulation.

The lower portion of FIG. 4 illustrates, in a comparable scale, the concurrently occuring change of state of air as passing through heat exchanger 5. Air is compressed in the compressor 7 along the isentropic portion $h \rightarrow i$. The air is heated (branch $i \rightarrow k$) through heat exchange with the principal working fluid of the system. As to the working fluid, that corresponds to branch $b \rightarrow a$. The air is decompressed in turbine 6 along the isentropic curve $k \rightarrow i$ and, possibly cooled, along line $l \rightarrow h$. That latter branch is present only in case of a closed loop air circulation but is omitted for open loop circulation. The hot air at point 1 can be discharged, for example, into the desalination plant, and cool air (point $h$) may enter the system from the environment.

Turning now to particulars of FIG. 2, an individual unit includes essentially all of the components as shown in FIG. 1 in form of a serial arrangement. The nuclear reactor 10 of the system as a whole is, therefor, divided into a plurality of subreactors such as 1, 1', 1'', disposed respectively in the rear of each unit. The units are elongated in construction and extend parallel to each other. The reactor portions are aligned transversely to that direction of predominant extension of each unit.

The particular two-phase nozzle 2 is disposed behind the fuel elements of subreactor 1'. Next in line is the hollow jet condenser 3, inductive MHD-converter 4, diffusor and shock-condenser 8 for self-energization, and heat exchanger 5 driving aggregate 11. All these components constitute a structural unit. As the other units, such as 9', 9'', are similarly constructed, similar components are aligned transverse to the predominant extension of each unit.

Elements 14, 15 and 18 provide shielding that encases the entire system. Unit 9 has power cable 23, unit 9' has a cable 23', unit 9'' a cable 23'' etc.; these cables are all connected in parallel and to the common bus system 33 that constitutes the electrical output of the plant. Reference numeral 13 denotes the control cable for unit 9 which includes signal lines providing signal in representation of the particular operational state of unit 9. There being similar cables 13', 13'' and others respectively for units 9' and 9'' and others.

These signal lines included in cables 13 and others feed a process control computer 25, individually controlling the reactor and MHD-generator portions in accordance with a program that depends on the demand for power on bus 33. The control signals pass from the computer to the several units via control lines included in the several cables 13, 13' etc.

The front end of each unit has a tube, such as tube 12 of unit 9. Cables 13 and 23 pass through tube 12. Additionally, cool air enters the system through tube 12. Hot air is discharged from unit 9 through opening 17. The arrows in the opening denote the path of air flow in the system. Hot air discharged from the several units combines in a collection chamber 26 and flows through openings to desalination plant, or chemical plant 27, for heating therein.

FIG. 3 illustrates what can be described to be a cross section through a bundle of units of the type shown in FIG. 2 and arranged in a compact, honeycomb-type arrangement. The wall structure 19 establishes suitable support for the several units. The individual units are to some extent known per se as to their particular contribution to the operation as a whole. The invention resides in the construction of a power plant from such units as self-contained units with regard to the MHD-process. They ae electrically connected in parallel and their nuclear process is controlled, for example, by electronic computer 25, to optimize operation as to power requirement. Utilization of air as cooling medium for removal of thermal energy from the principal circulation yields a high degree of independence of the locaton of the power plant.

Aggregate 11 comprised of gas turbine 6 and compressor 7 provides air at an elevated pressure to improve heat transfer from the working fluid so as to reduce the need for large cooling surfaces. The power for the compressor is produced in the gas turbine using residual thermal energy extracted from the circulating stream of alkaline working fluid (characteristics $b \to a$ and $i \to k$). Each unit has its own aggregate so that the several units as they operate in parallel, are decoupled as to cooling. Cooling of each unit can be controlled to match the requirements for cooling of a particular unit in dependence upon its power output.

The several units in a single power plant are coupled to each other three fold. First, neutron flux of the subreactor units 1, 1', 1'' etc. is shared due to proximity. Secondly, the units operate on a common power bus 33. Thirdly, the control of the units is interrelated in accordance with a particular program.

Each unit has two operational modes. In the cooling mode the respective MHD-converter takes electrical energy from the electrical circuit to pump liquid working fluid as cooling medium through the reactor, i.e., such a unit acts as a load on bus 33 and causes the working fluid to circulate through its loop. In the cooling mode the production of thermal energy in the particular reactor portion is rather low, too low to permit useful extraction of electrical energy from the MHD-generator.

The second mode is the power mode in which electrical energy is produced by and can be taken from the unit when operated in that mode. A unit operated in the power mode can be shifted into the cooling mode through control of neutron flux in the particular unit. That control is particularly provided by the computer 25. In case the power requirement on bus 33 increases, a unit that is currently operated in the cooling mode can be shifted into the power mode, to participate in the production of electrical energy.

The neutron flux decreases in the border zone of the reactor (e.g. in units 1'). This "natural" distribution in neutron flux is utilized by having the outer units operate under stand-by conditions to be normally in the cooling mode.

A power plant controlled in such a manner operates particularly advantageous in comparison with a conventional power plant, as neither heavy masses such as rotors, flywheels, etc., nor stored energy steam volumes have to be considered upon change in power requirements. Thus, the response delay as to control operation of the system in accordance with the invention is considerably reduced, which, in turn, means that the power output of the plant may follow promptly even comparatively large, suddenly occuring variations in power requirements.

It will be recalled that the electronic computer 25 supervises the reactors and MHD-converters in a process control operation and in dependence upon the power requirement. The program alluded to above refers specifically to the selection of power mode-cooling mode for the several units and to the selection of which unit is to undergo a change in mode.

Another advantage of the invention is to be seen in the high degree of independence of each unit. Therefor, in case a defect occurs in one of them, the plant does not have to be shutdown as a whole. Instead, through appropriate control operations, the particular defective unit can be shutdown and replaced. The units do not only operate but are also constructed and manufactured as individual replacement units. Spare units may be kept as inventory, so that in case one of them is found to be defective, it can be replaced as a whole by readily available new one, while the removed, defective one is repaired. This, in turn, increases the availability of the plant as a whole, as the plant is not fully operationally only for the time it takes to replace a unit. If the plant has many units that exchange diminishes the available plant output only by a fraction of total output which is noticeable only if the plant operates at maximum capacity.

On the other hand, testing as well as production of such units is simplified, as compared with conventional equipment. Also, rating of a power plant differs from others of similar construction merely in the number of units employed. The honeycomb arrangement, as shown in FIG. 3, permits not only indefinite increase extension of a plant, but different size plants are compact so as to differ little in overall size.

The invention is not limited to the embodiments described above but all changes and modifications thereof not constituting departures from the spirit and scope of the invention are intended to be included.

I claim as my invention:

1. Power plant including nuclear reactor means, comprising:
   a plurality of similarly constructed units, each unit including a portion of the nuclear reactor, including nuclear fuel elements for developing thermal energy for the unit, each unit further having an individual, closed loop circulation path for liquidous alkaline metal as working and cooling liquid, passing through the reactor portion of the respective unit in heat exchanging relation therewith, there being a separate circulation path of alkaline metal in each unit, and a separate MHD-generator included in the respective circulation path for and of each unit accordingly, the alkaline metal passing through and serving as working fluid for the respective MHD-generator;
   the units of the plurality disposed in a bundle so as to be located in the vicinity to each other so that the several portions of the reactors are intercoupled through the neutron flux as established by each portion, the bundling providing inner units and outer units of the bundle;
   circuit means connected to the MHD-generators of the units, for connecting the respective electrical outputs of the generators in parallel so that the individual units operate as load wherein the MHD-generator of a unit draws energy from the circuit means and pumps working fluid through the unit, or as power producing unit, the outer units normally operating as pumps; and means defining an air circulation path coupled to the closed loop circulation paths for working fluid of the units of the plurality ahead of the respective returns thereof to the nuclear reactor, for extracting therefrom residual thermal energy.

2. Power plant as in claim 1, the units of the plurality each having elongated extension, the nuclear reactor portion being on one end of each unit, an air-alkaline heat exchanger disposed close to the other end of each unit, the units disposed parallel to each other, the nuclear reactor portions aligned parallel to a plane transverse to the elongated extension of the units.

3. Power plant as in claim 1, the units of the plurality stacked in a bundle, there being outer ones and inner ones, the plant including control means connected to the units for normally operating the inner units for production of power, the outer units as disposed around the inner units establishing power reserve units, normally operated as loads, the control means operating the later units also for production of power upon increase of power demand.

4. Power plant as in claim 1, there being a honeycomb support structure for the units of the plurality.

5. Power plant as in claim 1, the air circulation path including a compressor and a turbine coupled for driving the compressor, the compressor sustaining air circulation for heat exchange with the alkaline metal, the turbine receiving the heated air.

6. Power plant as in claim 1, each unit including a compressor, a turbine, and a heat exchanger, the heat exchanger having primary circulation that is included in the closed circulation of alkaline metal in the unit, having secondary circulation of air, circulated by the compressor and driving the turbine, the turbine driving the compressor.

7. Power plant as in claim 1, the air circulation path including all units of the plurality, there being a sea water desalination plant connected to receive the heated air from all units as principal heating source.

8. Power plant as in claim 1, including common control means, individually controlling the nuclear reactor portions in accordance with a particular program and in dependence upon demand for electrical power.

9. Power plant as in claim 1, the program causing the control means to operate some of the units for production of electrical energy, others of the units are operated as load, some of the latter units operated for production of energy upon increase of demand.

10. Method of generating electrical energy, comprising the steps of providing a plurality of similarly constructed units, each unit including a portion of the nuclear reactor, including nuclear fuel elements for developing thermal energy for the unit, each unit further having an individual, closed loop circulation path for a cooling and working fluid, and a separate MHD-generator in the respective circulation path for each unit;

causing alkaline metal to circulate in each circulation path in heat exchange relation with the respective reactor portion of the unit and as working fluid for and in the respective MHD-generator;

disposing the units in a bundle so as to be located in the vicinity to each other so that the several portions of the reactors are intercoupled through the neutron flux as established by each portion, the bundling providing inner units and outer units of the bundle;

electrically interconnecting electrical outputs of the MHD-generators of the units in parallel;

operating the inner units of the bundle as electrical power producing units; and operating the outer units as pumps by drawing power from the inner units and causing the respective MHD-generator to pump the working fluid through the respective units.

11. A method as in claim 10, and including the step of changing the number of units operated as power producing units vs. the number of units operating as pumps.

12. Power plant including a nuclear reactor comprising:

a plurality of heat exchange fluid paths and circulations through the nuclear reactor, each path traversing different portions of the reactor;

a plurality of MHD-generators each included in one of the circulations and operating with the same heat exchange fluid of the respective circulation that traversed one of the portions of the reactor, the heat exchange fluid in each circulation by alkaline metal;

the different portions of the reactor having a common neutron flux distribution;

some of the MHD-generators operating as pumps at relatively low thermal energy production in the respectively associated nuclear reactor portion;

the remainder of the MHD-generators operating as electric power generators at relatively high thermal energy production in the respectively associated nuclear reactor portion; and circuit means interconnecting the MHD-generators so that the ones operating as generators drive the ones operating as pumps, the remainder of electric power generated being usefull electric output.

13. Power plant as in claim 12, wherein the reactor is physically subdivided into portions, the portions being physically mounted together with the respective MHD-generator in a modular construction of similar units, each composed of a reactor portion, and MHD-generator of the plurality and the circulation of alkaline metal.

14. Power plant as in claim 12, and including an additional circulation common to all units and having air coupled in heat exchange relation to the alkaline circulations of the units prior to return thereof to the respective nuclear reactor portion.

* * * * *